Dec. 13, 1966 S. MICHEL ET AL 3,291,604
PROCESS FOR CREATING AND SUBSEQUENTLY TRANSFERRING
AN IONIC PHOTOCHROMIC IMAGE
Filed Feb. 1, 1963
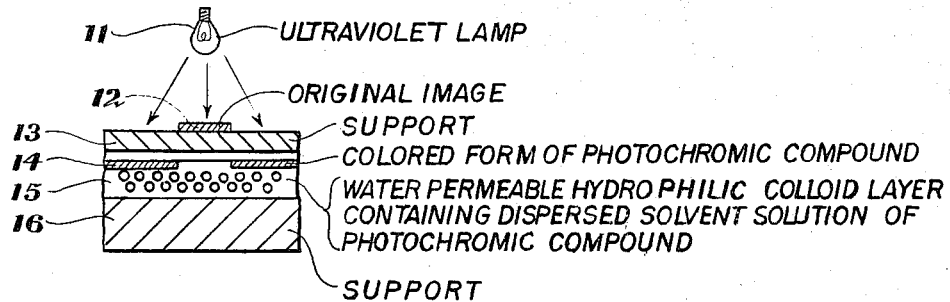
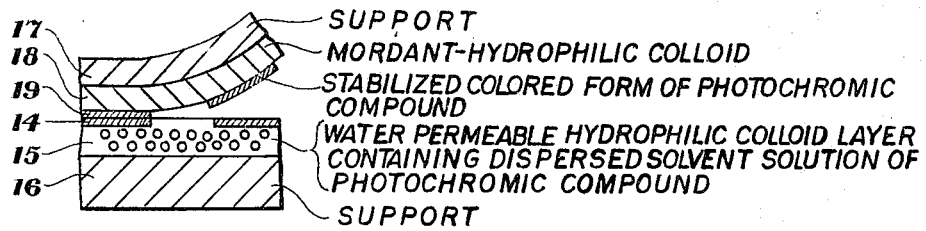
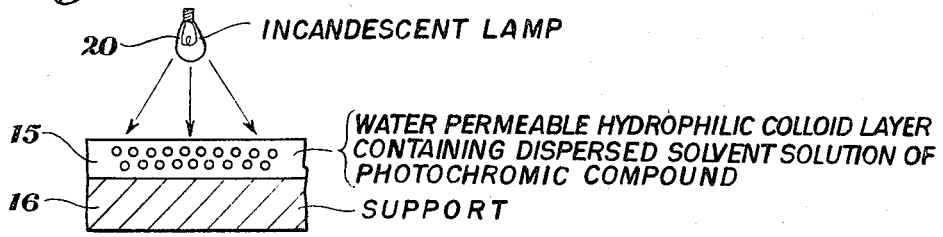
Stephen Michel
George M. Reitter
INVENTORS
BY R. Frank Smith
Ray Carter Livermore
ATTORNEY & AGENT United States Patent Office 3,291,604
Patented Dec. 13, 1966

3,291,604
PROCESS FOR CREATING AND SUBSEQUENTLY TRANSFERRING AN IONIC PHOTOCHROMIC IMAGE
Stephen Michel and George M. Reitter, Rochester, N.Y., assignors to Eastman Kodak Company, Rochester, N.Y., a corporation of New Jersey
Filed Feb. 1, 1963, Ser. No. 255,602
11 Claims. (Cl. 96—29)

This invention is related to a novel copy process, and more particular to reversible photochromic matrices, a mordanted receiving sheet and a novel copy process in which a photographic image is stabilized.

Photochromism, the reversible formation of colored modifications of certain compounds as a result of ultraviolet irradiation is known. The photochromic compounds usually exist in an uncolored form which upon irradiation with ultraviolet light are converted to a colored form that spontaneously fades to the original uncolored form. The fading of the colored form of some photochromic compounds is accelerated by irradiation with visible light while the fading of the colored form of other photochromic compounds is accelerated by irradiation with heat.

Attempts have been made to stabilize the colored form of the photochromic image. In one prior art method, for example, a matrix is made in which the photochomic material and a volatile solvent are contained in frangible capsules in a coating; the capsules are ruptured against a receiving sheet and the solvent allowed to evaporate to stabilize the image. In other methods used in attempts to stabilize the colored image, the colored image is stabilized to some degree but the uncolored form still present can print-out on further exposure.

It is therefore an object of our invention to provide a new reversible photochromic matrix and a special mordanted receiving sheet that are used to produce stabilized photochromic images that do not fade and are not subject to print-out on further exposure to activating radiation.

Another object is to provide a process for exposing our reversible photochromic matrix to ultraviolet radiation through an original image to produce the corresponding colored photochromic image, then transferring only the colored image to a mordanted receiving sheet which stabilizes the colored image against fading.

Another object is to provide a reversible photochromic matrix which after exposure and transfer of the colored image in a stabilized form on the receiving sheet, is erased, re-exposed to another image, transferred to fresh receiving sheet, etc., until as many as 20 copies have been made of different originals if desired.

Still other objects will become apparent from the following specification and claims.

These and other objects are accomplished by the use of our invention.

Our reversible photochromic matrix in its simplest form comprises a support coated with a photochromic layer comprising a water-permeable hydrophilic colloid in which is dispersed a solution of a photochromic compound in a water-immiscible, high-boiling solvent.

Our mordanted receiving sheet in its simplest form comprises a support that is coated with a layer comprising a mixture of a water-permeable hydrophilic colloid and a mordant.

Our copying process comprises the steps of:
(1) Exposing the matrix with ultraviolet light through an original image to be copied to produce the corresponding colored image which is a negative of the original, that is, areas of the original that transmit the ultraviolet printing light form corresponding areas of colored photochromic material while the unexposed areas of the photochromic matrix remain uncolored;

(2) Transferring only the colored photochromic image from the photochromic layer to a receiving sheet by contacting in superposed position, the photochromic layer with the water-moistened hydrophilic colloid-mordant layer of the receiving sheet; and (3) Separating the receiving sheet with the stabilized colored image of the original from the matrix.

The residual color image on the matrix is then erased by exposure to radiation of a wavelength longer than 4000° A. The erased matrix is then ready to be used to copy another original object by repeating the Steps 1 through 3. This process is repeated for up to twenty times using the same reversible photochromic matrix. A fresh receiving sheet is used for each image to be transferred.

The image exposure of the photochromic matrix is accomplished by using ultraviolet light, that is, light having a wavelength shorter than 4000° A. Any convenient ultraviolet light source can be used, such as, a mercury vapor lamp, e.g., a General Electric Sun Lamp, a carbon arc lamp, etc.

Image exposure is accomplished advantageously by projection printing so that the original image may be enlarged in size or reduced in size in the print made by the process, and by contact printing.

In an alternative process of our invention, the matrix is exposed uniformly to ultraviolet light to produce the colored form of the photochromic compound. The colored form is then reconverted imagewise to the colorless form by exposure through an original image to radiation of a wavelength longer than 4000° A. This results in a positive of the original which is stabilized by transferring to the receiving sheet as described previously in steps 2 and 3.

The residual color image left on the matrix after the transfer step can be erased by exposure to radiation of wavelength longer than 4000° A. or by uniform exposure to ultraviolet light depending upon whether the next copy desired is a negative or a positive reproduction of an original.

The photochromic compounds used to advantage according to our invention include those which in their uncolored form are soluble in the water-immiscible, high-boiling solvents but are not soluble in an aqueous medium and will therefore not be diffusible from the high-boiling solvent into an aqueous medium, while the colored form of the same photochromic compound is ionic and is less soluble in the high-boiling solvent than the uncolored form but is water soluble and tends to diffuse from the high-boiling solvent into the aqueous medium present at the time of transfer.

The photochromatic compounds used to advantage in our reversible photochromotic matrices include the indolinobenzo-pyrylospirans having the formula:

I
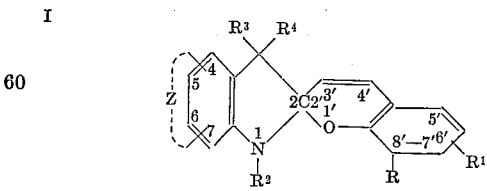

wherein Z represents the nonmetallic atoms necessary to complete a benzene ring fused to the benzo group at the carbons in the 4,5 positions, the 5,6 positions or the 6,7 positions, R and R¹ each represents a member selected from the class consisting of a hydrogen atom, a lower alkyl group, such as methyl, ethyl, propyl, isopropyl, butyl, secondary butyl, tertiary butyl, etc., an alkoxy group having from 1 to 4 carbon atoms, such as methoxy, ethoxy, propoxy, butoxy, etc., a hologen atom, such as chlorine, bromide, iodine, fluorine, etc., and the nitro group; and $R^2$, $R^3$, and $R^4$ each represents a group selected from the class consisting of an alkyl group having from 1 to 7 carbon atoms, such as methyl, ethyl, β-hydroxyethyl, benzyl, methylsulfonamidomethyl, β-(methylsulfonamido) ethyl, carboxyethyl, carboxybutyl, carboxyheptyl, sulfomethyl, sulfopropyl, sulfoheptyl, butyl, hexyl, heptyl, etc., and an aryl group, such as phenyl, 4-methylphenyl, 4 - sulfamylphenyl, 3 - sulfonamidophenyl, 4-carbamylphenyl, 4-carboxyphenyl, 3-carboxyphenyl, 4-sulfophenyl, 2-chlorophenyl, 2,4-dichlorophenyl, 2,4,6-trichorophenyl, etc., such that the total number of carbon atoms in $R^2+R^3+R^4$ is not greater than 9.

The reversible photochromic layer for our matrix is coated on a suitable support from a despersion of a solvent solution of one or more of the photochromic compounds of Formula I in a water solution of a water-permeable hydrophilic colloid. The solution is made by dissolving the photochromic compound or mixture of compounds in a water-immisible, high-boiling solvent or mixture of these solvents that has been heated to about 70° to 110° C. This solution is cooled to about 50° C. and added to an aqueous solution of the water-permeable hydrophilic colloid at the same temperature. Alkanol B, a propylated naphthalene sulfonate, may be added to the mixture which is then intimately mixed into a fine dispersion. A coating aid such as saponin is then added to the dispersion, entrained air allowed to separate and the foam removed by filtration through a fine mesh stainless steel screen. A hardener such as formalin may be added to the filtrate which is coated on the support material.

Photochromic compounds used to advantage according to our invention include the following representative examples used for illustration, but it is to be understood that our invention is not to be limited to these compounds.

Compound 1.—6' - nitro-1,3,3-trimethylindolinobenzopyrylospiran.

Compound 2.—8'-methoxy - 6' - nitro-1,3,3-trimethylindolinobenzopyrylospiran.

Compound 3.—6'-methoxy - 8 - nitro-1,3,3-trimethylindolinobenzopyrylospiran.

Compound 4.—6'-bromo-8'-nitro-1,3,3 - trimethylindolinobenzopyrylospiran.

Compound 5.—8' - nitro-1,3,3-trimethylindolinobenzopyrylospiran.

Compound 6.—6'-nitro-1,3,3-trimethyl-4,5-benzoindolinobenzopyrylospiran.

Compound 7.—6'-nitro - 1 - (β-hydroxyethyl)-3,3-dimethylindolinobenzopyrylospiran.

The water-immersible, high boiling solvents used to advantage for dissolving photochromic compounds of Formula I include any of the high boiling crystalloidal solvents, such as, are listed in Mannes et al. U.S. Patents 2,304,939 and U.S. 2,304,940, both issued December 15, 1942, Jelley et al. U.S. 2,322,027, issued June 15, 1943, and others. Representative solvents include dibutyl phthalate, β-methoxyethyl phthalate, ethyl-N,N-di-n-butyl-carbamate, tricresylphosphate, tri-p-tert. butylphenyl phosphate, triphenyl phosphate, ditetrahydrofurfuryl succinate, tetrahydrofurfuryl benzoate, N-n-amylphthalamide, N-n-amyl succinimide, triethylene glycol, ethylene glycol monobenzyl ether, glycol salicylate, etc. Any of these solvents may be used in combination with an auxiliary solvent such as benzene.

We have found that the photochromic compound to solvent ratio may be varied over a considerable range. A good operating range is from about 0.03:1 to 1.4:1, however, the preferred range is from about 0.13:1 to 1.4:1 in terms of weight.

The water-permeable hydrophilic colloids that are used to advantage in making the photochromic layers include representative colloids, such as, gelatin, collodions, gum arabic, cellulose ester derivatives such as alkyl esters of carboxylic cellulose, hydroxy ethyl cellulose, carboxy methyl hydroxy ethyl cellulose, synthetic resins, such as the amphoteric copolymers described by Clavier et al. in U.S. Patent 2,949,442, issued August 16, 1960, polyvinyl alcohol, and others well known in the art. The above-mentioned amphoteric copolymers are made by polymerizing the monomer having the formula:

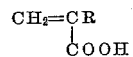

wherein R represents an atom of hydrogen or a methyl group, and a salt of a compound having the general formula:

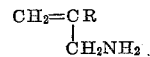

wherein R has the above-mentioned meaning, such as an allylamine salt. These monomers can further be polymerized with a third unsaturated monomer in an amount of 0 to 20% of the total monomer used, such as an ethylene monomer that is copolymerizable with the two principal monomers. The third monomer may contain neither a basic group nor an acid group and may, for example, be vinyl acetate, vinyl chloride, acrylonitrile, methacrylonitrile styrene, acrylates, methacrylates, acrylamide, methacrylamide, etc. Examples of these polymeric gelatin substitutes are copolymers of allylamine and methacrylic acid; copolymers of allylamine, acrylic acid and acrylamide; hydolyzed copolymers of allylamine, methacrylic acid and vinyl acetate; copolymers of allylamine, acrylic acid and styrene; the copolymer of allylamine, methacrylic acid and acrylonitrile; etc.

We have found that the ratio of photochromic compound solution to the hydrophilic colloid used in making the photochromic layer for our matrix can vary over the range of from about 0.04:1 to about 0.56:1 in terms of weight. The light-sensitive composition is coated to advantage over a range of rates from about 0.022 g./ft.² to about 0.160 g./ft.².

Any suitable support may be used for the matrix, including metal sheeting, glass, any of the conventional photographic element supports such as paper, cellulose nitrate, cellulose acetate, cellulose acetate butyrate, cellulose acetate propionate butyrate, synthetic resins, etc.

The mordanted receiving sheet is a support such as described for the matrix, upon which is coated an aqueous solution comprising water, a mordant, and a water-permeable hydrophilic colloid as described for the matrix. It is advantageous to add to this solution a coating aid such as saponin, and a hardener such as formalin, just before coating the composition on a support. Although the ratio of mordant to hydrophilic colloid can be varied over a wide range, we have found a preferred range is from about 0.2:1 to about 0.8:1.

The mordants used to advantage in our receiving sheets include most anionic detergents. The preferred mordants include compounds, such as, the polymerized sodium salts of substituted alkyl sulfonic acid, alkyl long chain sold under the name Daxad 23 by Dewey and Almy Chemical Co.; the monocalcium salt of polymerized alkyl aryl sulfonic acid, alkyl long chain sold under the name Daxad 21 by Dewey and Almy Chemical Co.; sodium lauryl sulfate available from the Dupont Company under the name Dupanol C or Dupanol ME; the anionic mordants represented by the formula

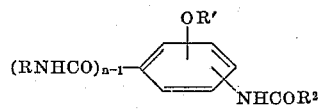

wherein $n$ represents a positive integer of from 1 to 2, R and R' represent monocyclic aryl groups of the benzene series, one of which contains an alkyl group of at least 5 carbon atoms, $R^2$ represents an alkali metal or ammonium monocyclic sulfoaryl; and carboxy aryl groups of the benzene series, of Saunders et al. U.S. Patent 2,756,149, issued July 24, 1956, such as, 5-[4-(2,4-di-tert-amylphenoxy) - 3 - (phenylcarbamyl) - phenylcarbamyl]-1,3-benzene disulfonic acid dipotassium salt, 5-[2-(2,4-di-tert-amylphenoxy)-phenylcarbamyl] - 1,3 - benzene disulfonic acid dipotassium salt, etc., etc.

Our invention is further illustrated by the following examples illustrating the preparation of our matrices, our receiving sheets and their use in a copying process to produce a stabilized color image of an original.

EXAMPLE 1

(a) A reversible photochromic matrix was prepared as follows:

One-half gram of 6'-nitro-1,3,3-trimethylindolinobenzopyrylospiran was dissolved in 4 ml. of tri-o-cresyl phosphate at 100° C. The solution was cooled to 50° C. and added to 25 ml. of 10% gelatin at 50° C. Two ml. of a 5% solution of Alkanol B was added and the mixture intimitely blended into a fine dispersion. Two ml. of a 7.5% solution of saponin were added and the dispersion allowed to stand at 50° C. for 15 minutes to allow the air to separate. The foam was removed by filtration through a fine mesh stainless steel screen. The filtrate was coated 0.006 inch thick on a clear cellulose acetate butyrate support and dried. These coatings were also made on a white pigmented cellulose acetate butyrate support.

(b) A mordanted receiving sheet was prepared as follows:

The mordant, 7.84 g. of 5-[4-(2,4-di-tert-amylphenoxy)-3 - (phenylcarbamyl) - phenylcarbamyl] - 1,3 - benzene-disulfonic acid dipotassium salt was dissolved in a mixture of 35 ml. of water and 10 ml. of ethyl alcohol by heating. The solution was added to a mixture of 90 ml. of 10% gelatin, 10 ml. of a 7.5% solution of saponin, 10 ml. of a 5% solution of Alkanol B at 50° C. Before coating, one ml. of a 4% formalin was added and the mixture coated 0.006 inch thick on both a clear cellulose acetate butyrate support and a white pigmented cellulose acetate butyrate support.

The following example will illustrate our copying process used to make a stabilized color print using a reversible photochromic matrix.

EXAMPLE 2

The substantially uncolored matrix prepared in Example 1 was exposed to an ultraviolet light source through an original image to produce on areas of the reversible photochromic layer exposed to ultraviolet light, a blue image consisting of the colored form of the photochromic compound against the uncolored form of the photochromic compound. The matrix was then squeezed in contact in superposed relation with the mordant-colloid layer of the receiving sheet made in Example 1 that had been moistened with water. After transferring for 10 seconds, the matrix and receiving sheet were separated and an orange-yellow colored image corresponding to the blue image remained on the receiving sheet. On drying, the image became magenta colored. This stabilzed color image did not fade upon prolonged exposure to strong light in the visible region of the spectrum. Exposure of this print to ultraviolet light did not change the image indicating that none of the uncolored photochromic compound transferred to the receiving sheet.

The residual blue colored image remaining on the matrix after the transfer step was erased by exposure to an incandescent lamp, then immediately exposed to ultraviolet light through another image, followed by the transfer of the new colored image to a fresh mordanted receiving sheet to produce the corresponding stabilized magenta colored image of the new original on the receiving sheet. This process was repeated 20 times with the matrix to produce copies of 20 different originals. The transferred magenta image made from each original was stable and did not fade.

Transfers made at temperatures from 40 to 100° F. showed that almost identical transferred images were obtained over this range of temperatures.

The following example will illustrate a modification in preparation of a matrix.

EXAMPLE 3

A reversible photochromic matrix was made as described in Example 1 excepting that: (1) 0.2 g. of photochromic compound 2 was used; (2) compound 2 was dissolved in a mixture of 2 ml. of benzene and 2 ml. of tri-o-cresyl phosphate at 80° C.; and (3) 1 ml. of 1% solution of formalin was added to the filtrate just prior to coating 0.006 inch thick on both the clear and pigmented supports of the type used in Example 1.

Similarly a matrix was made for each of the representative photochromic Compounds 3, 4, 5 and 6 described previously.

EXAMPLE 4

A receiving sheet was made as follows: One-half gram of the mordant, polymerized sodium salts of substituted benzoid alkyl sulfonic acid, alkyl long chain was added to 2 ml. of ethyl alcohol, and 9 ml. of water were added to the resulting slurry to dissolve the compound. The solution was added to 25 ml. of an aqueous solution containing 10% gelatin. Two ml. of a 7.5% solution of saponin were added followed by 1 ml. of 1% formalin just before coating 0.006 inch on a clear cellulose acetate butyrate support and on a white pigmented cellulose acetate butyrate support.

Similarly other receiving sheets were made in which the mordant used in Example 4 was replaced first by a monocalcium salt of polymerized alkyl aryl sulfonic acid, alkyl long chain, then by sodium lauryl sulfate.

EXAMPLE 5

Each of the 5 reversible photochromic matrices made in Example 3 were image exposed, and transferred to samples of the receiving sheets made in Example 4. In each instance, a good, stable dye image was obtained on the mordant-hydrophilic colloid layer of each receiving sheet. The color of the stabilized image was determined by the photochromic compound in the matrix from which the stabilized copy was derived. The following table summarizes the color of the dried and stabilized images obtained.

| Photochromic compound number: | Color of stabilized image produced on receiving sheet |
|---|---|
| 1 | Red-magenta |
| 2 | Blue-magenta |
| 3 | Green-cyan |
| 4 | Blue |
| 5 | Red-magenta |
| 6 | Magenta |
| 7 | Magenta |

The image transferred to the receiving sheet of Example 4 that has been coated on clear support can be used as an original to make further copies by well known diazo office copy process. The original matrix cannot be used for this purpose because there is little difference in the ultraviolet absorption between the colored and uncolored formation of the photochromic compounds. The only requirement is that the mordant not absorb ultraviolet in the region of the diazo element sensitivity.

EXAMPLE 6

The substantially uncolored matrix prepared in Example 1 was given a uniform exposure to ultraviolet light source to produce the blue colored form of the photochromic compound. The blue colored matrix was then exposed through an original image to radiation of a wavelength longer than 4000° A. Where exposure occurred, the blue colored photochromic compound was changed to the colorless form and the resulting image was a positive reproduction of the original.

The image was stabilized by transfer to the mordanted receiving sheet as in Example 2.

The pH of the aqueous medium can be adjusted to minimize the transfer of the uncolored form of the photochromic compound. In other words by proper pH adjustment, the partition coefficient of the colored form of the photochromic compound can be enhanced in favor of the aqueous medium.

For example, if the uncolored form of a photochromic compound containing an acidic group is too soluble in the aqueous medium at a high pH so that not only the colored form but also the uncolored form of the photochromic compound transfers to the receiving sheet it is advantageous to use a less alkaline, a neutral or even an acid aqueous medium for the transfer.

Although the illustrative examples shown use single photochromic compounds in the matrices, it is understood that combinations of photochromic compounds can be used to give variations in the color of image. For example, it may be desirable to produce a neutral image. Similarly it is sometimes advantageous to use mixtures of the mordants to alter the mordanting characteristics of the receiving sheet.

We have found that when the photochromic image transfer is effected in the presence of an acid medium that the transferred images are yellow in color. The transferred and stabilized yellow images made in this way are converted to the color they would have had if transferred in the presence of water, by treating in dilute alkali metal carbonate solution.

The representative photochromic compounds used to illustrate our invention may be prepared as described in the literature. For example, the preparation of Compounds 1 and 5 is described by Knott in Journal of the Chemical Society, November 1951 on page 3045, and Compounds 1, 2, 3, and 4 are described by Berman, Fox and Thomson in Journal of the American Chemical Society, 81, 1959 (5605–5608). Compound 6 can be prepared by the general method described by Berman, Fox and Thomson by reacting 2-hydroxy-5-nitrobenzaldehyde with 2 - methylene - 1,3,3 - trimethyl - 4,5 - benzoindoline. Other compounds having the Formula I can be prepared by this general method by using the appropriate starting materials.

The preparation of Compound 7 will further illustrate the invention. A reaction mixture containing 5.6 g. of 1 - ($\beta$ - hydroxyethyl) - 2,3,3 - trimethylindolinium bromide, 3.32 g. of 5-nitro salicyl aldehyde, 60 ml. of ethanol and 2 ml. of pyridine was refluxed for one hour. The solution was then cooled to yield purple crystals which were separated by filtration, dissolved in 60 ml. of ethanol and recrystallized to give 3 g. of lustrous crystal plates having a M.P. of 169°–170° C.

The intermediate 1-($\beta$-hydroxyethyl)-2,3,3-trimethylindolium bromide used was prepared as follows. A mixture of 32 g. of 2,3,3-trimethylindole and 25 g. of 2-bromoethanol (in a 300 ml. flask) was heated on a steam bath with stirring for two hours. The thick syrup that resulted was boiled in acetone. The solid was filtered, dried, ground, slurried in additional acetone and filtered. The product 37 g. of a pink powder was recrystallized from ethanol as the pure, white quaternary salt.

Our invention is still further illustrated by the accompanying drawings FIGS. 1, 2 and 3 which show greatly enlarged cross-sections of our reversible photochromic matrix, our receiving sheet and an original image.

FIG. 1 shows the image exposure of a reversible photochromic matrix consisting of support 16 coated with a water-permeable hydrophilic colloid layer 15 containing a dispersed solvent solution of a photochromic compound by exposing layer 15 to ultraviolet source 11 through original image 12 on support 13 to produce the colored image 14 made up of the colored form of the photochromic compound.

FIG. 2 shows the step of separating the mordant-hydrophilic colloid layer 18 on support 17 from the water-permeable hydrophilic colloid layer 15 containing dispersed solvent solution of photochromic compound, said layer 18 carrying on its surface the stabilized colored image 19 consisting of the colored form of the photochromic compound transferred from image 14 on the surface of layer 15.

FIG. 3 shows the photochromic matrix of FIG. 2 comprising support 16 and layer 15 described previously after it has been exposed to light from the incandescent lamp 20 and erased the colored image 14 that was shown in FIG. 2.

The process of our invention is valuable for producing stabilized photochromic images of an original. In this process the surface of a reversible photochromic layer bearing an unstable colored photochromic image produced by exposure to ultraviolet light from an original is contacted in the presence of moisture with the surface of a mordant containing receiving sheet. Separation of the receiving sheet from the reversible matrix leaves a stabilized colored image of the original on the receiving sheet. If any residual colored image remains on the reversible photochromic matrix, it will fade out in a short time or can be immediately erased by exposure to the appropriate radiation. The matrix is then ready for exposure to another original and transfer of a stable image to a fresh receiving sheet. This operation can be repeated with a given matrix to produce a copy of as many as twenty different originals.

The invention has been described in detail with particular reference to preferred embodiments thereof but it will be understood that variations and modifications can be effected within the spirit and scope of the invention as described hereinabove and as defined in the appended claims.

We claim:
1. A process for producing and stabilizing a colored photochromic negative image reproduction of an original image comprising the steps:
 (1) creating an ionic colored photochromic negative image on a reversible photochromic layer comprising a water-permeable hydrophilic colloid having dispersed therein a solution of a photochromic compound dissolved in a water-immiscible, high-boiling solvent by exposing said reversible photochromic layer while in the uncolored state to radiation having a wavelength shorter than 4000° A. through said original image;
 (2) contacting in superposed relation in the presence of moisture, the surface of the photochromic layer bearing the colored photochromic negative image created in Step 1 with the surface of a receiving sheet comprising a water-permeable hydrophilic colloid-anionic mordant layer to transfer only the ionic colored photochromic image to the said surface of the receiving sheet; and
 (3) separating the said receiving sheet from the said photochromic layer, leaving a stabilized colored photochromic negative image reproduction of said original on said receiving sheet, said stabilized image being non-reversible.

2. A process for producing and stabilizing a colored photochromic positive image reproduction of an original image comprising the steps:
 (1) creating an ionic colored photochromic positive image on a reversible photochromic layer comprising a water-permeable hydrophilic colloid having dispersed therein a solution of a photochromic compound dissolved in a water-immiscible, high-boil- solvent by exposing said reversible photochromic layer while in the colored state to radiation having a wavelength longer than 4000° A. through said original image;

(2) contacting in superposed relation in the presence of moisture, the surface of the photochromic layer bearing the colored photochromic positive image created in Step 1 with the surface of a receiving sheet comprising a water-permeable hydrophilic colloid-anionic mordant layer to transfer only the ionic colored photochromic image to the said surface of the receiving sheet; and (3) separating the said receiving sheet from the said photochromic layer, leaving a stabilized colored photochromic positive image reproduction of said original on said receiving sheet, said stabilized image being non-reversible.

3. A process for producing and stabilizing a colored photochromic image reproduction of an original image comprising the steps:

(1) creating an ionic colored photochromic image on a reversible photochromic layer, said layer comprising a water-permeable hydrophilic colloid having dispersed therein a solution of a photochromic compound dissolved in a water-immiscible, high-boiling solvent by exposing said reversible photochromic layer to light through said original image;

(2) contacting in superposed relation in the presence of moisture:

(a) the surface of the said image exposed photochromic layer bearing the ionic colored photochromic image with (b) the surface of said receiving sheet, said sheet comprising a water-permeable hydrophilic colloid-anionic mordant layer to transfer only the ionic colored photochromic image to the said surface of the receiving sheet; and (3) separating the said receiving sheet from the said reversible photochromic layer, leaving a stabilized colored photochromic image on the surface of said receiving sheet, said stabilized image being non-reversible.

4. A process for producing and stabilizing a colored photochromic image reproduction of an original image comprising the steps:

(1) creating an ionic colored photochromic image on a reversible photochromic layer, said layer comprising a water-permeable hydrophilic colloid having dispersed therein a solution of a photochromic compound having the formula:

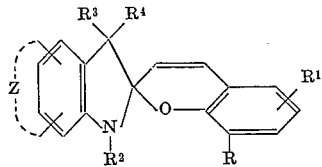

wherein Z represents the nonmetallic atoms necessary to complete a benzene ring fused to the indoline group; R and $R^1$ each represents a member selected from the class consisting of the hydrogen atom, a lower alkyl group, an alkoxy group, a halogen atom and the nitro group; and $R^2$, $R^3$ and $R^4$ each represents a member selected from the class consisting of an alkyl group having from 1 to 7 carbon atoms; and an aryl group, such that the total number of carbon atoms in $R^2+R^3+R^4$ is not greater than 9 dissolved in a water-immiscible, high-boiling solvent, said ionic colored photochromic image being created by exposing said layer to light through said image;

(2) contacting in superposed relation in the presence of moisture:

(a) the surface of the said image exposed photochromic layer bearing the ionic colored photochromic image with (b) the surface of said receiving sheet, said sheet comprising a water-permeable hydrophilic colloid-anionic mordant layer to transfer only the ionic colored photochromic image to the said surface of the receiving sheet; and (3) separating the said receiving sheet from the said reversible photochromic layer, leaving a stabilized colored photochromic image on the surface of said receiving sheet, said stabilized image being non-reversible.

5. A process of claim 4 in which the photochromic compound is 6'-nitro - 1,3,3 - trimethylindobenzopyrylospiran.

6. A process of claim 4 in which the photochromic compound is 6'-nitro-8'-methoxy-1,3,3-trimethylindolinobenzopyrylospiran.

7. A process of claim 4 in which the photochromic compounds is 6'-methoxy-8'-nitro-1,3,3-trimethylindolinobenzopyrylospiran.

8. A process of claim 4 in which the photochromic compound is 6' - bromo - 8' - nitro - 1,3,3 - trimethylindolinobenzopyrylospiran.

9. A process of claim 4 in which the photochromic compound is 6'-nitro-1,3,3-trimethyl-4,5-benzoindolinobenzopyrylospiran.

10. A process of claim 4 in which the hydrophilic colloid used in the reversible photochromic layer is gelatin, and the high-boiling solvent is tri-o-cresyl phosphate.

11. A process of claim 4 in which the hydrophilic colloid used in the reversible photochromic layer is gelatin, the high-boiling solvent is tri-o-cresyl phosphate and the photochromic compound is 6'-nitro-1,3,3-trimethylindobenzopyrylospiran.

References Cited by the Examiner

UNITED STATES PATENTS

| | | | |
|---|---|---|---|
| 2,940,849 | 6/1960 | Whitmore et al. | 96—29 |
| 2,953,454 | 9/1960 | Berman | 96—89 |
| 3,085,469 | 4/1963 | Carlson | 88—107 |

OTHER REFERENCES

NCR; ASD Technical Report 61–70 (Sci. Lib. Cat. No. TR/210/N37) December 1961; "Theoretical and Experimental Investigation of Photochromic Memory Techniques and Devices," pp. 332–363 of interest.

NORMAN G. TORCHIN, *Primary Examiner.*

A. LIBERMAN, D. D. PRICE, *Assistant Examiners.*